United States Patent [19]

Fowler et al.

[11] 4,027,398
[45] June 7, 1977

[54] SINGLE PIVOT REMOTE READING COMPASS

[75] Inventors: John T. Fowler, Winthrop, Mass.; Donald R. Furey, Metairie, La.

[73] Assignee: The Laitram Corporation, Harahan, La.

[22] Filed: June 17, 1975

[21] Appl. No.: 587,720

[52] U.S. Cl. .................. 33/363 K; 33/364
[51] Int. Cl.² ..................... G01C 17/26
[58] Field of Search ............ 33/363, 364, 355

[56] References Cited

UNITED STATES PATENTS

| 111,169 | 1/1871 | Bliss | 33/364 |
|---|---|---|---|
| 3,374,549 | 3/1968 | Hanson | 33/364 |
| 3,746,842 | 7/1973 | Fowler | 33/363 K |
| 3,833,901 | 9/1974 | Fowler | 33/363 K |
| 3,888,016 | 6/1975 | Fowler | 33/363 K |

FOREIGN PATENTS OR APPLICATIONS

| 9,926 | 1888 | United Kingdom | 33/364 |
|---|---|---|---|
| 19,057 | 1909 | United Kingdom | 33/364 |

Primary Examiner—William D. Martin, Jr.
Attorney, Agent, or Firm—Weingarten, Maxham & Schurgin

[57] ABSTRACT

A remote reading magnetic compass in which a coded compass disc is supported for rotation by a single upper pivot bearing which maintains the disc and associated compass magnet submerged in a damping liquid with positive buoyancy and which provides a selected range of tilt without gimbal mounting.

11 Claims, 4 Drawing Figures

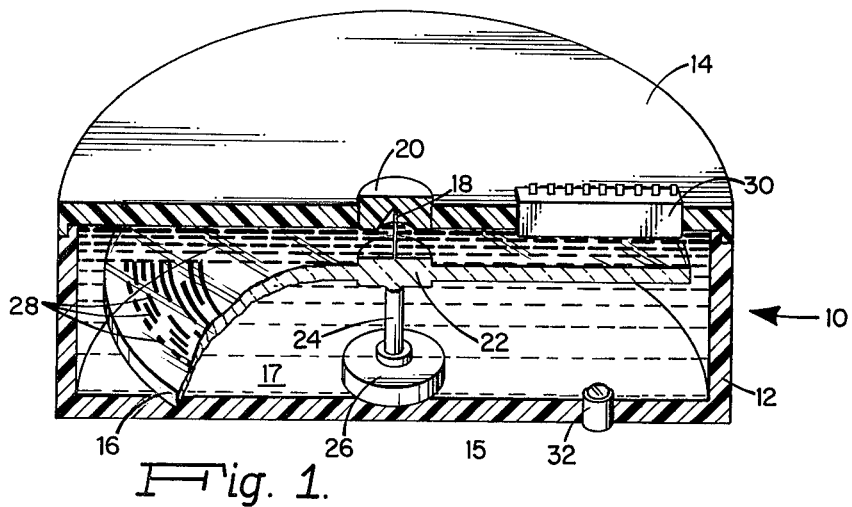
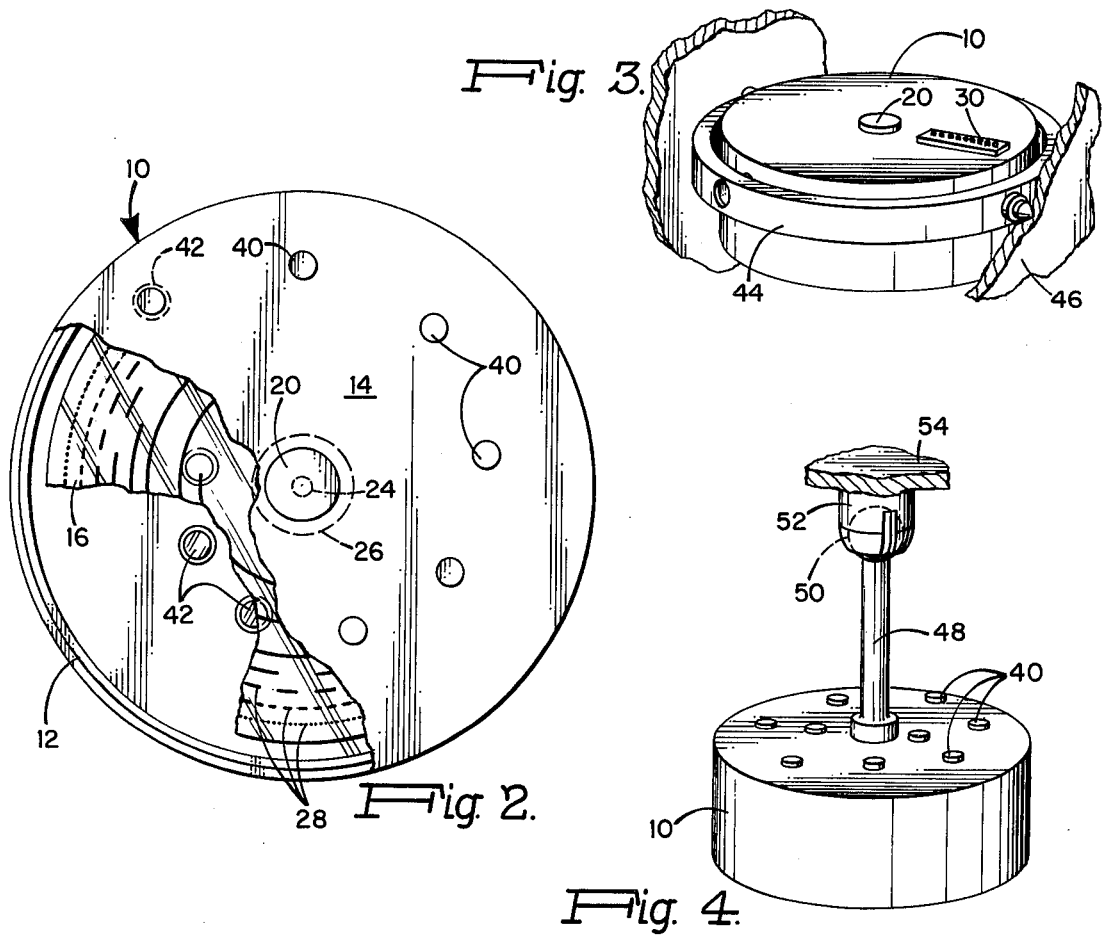

SINGLE PIVOT REMOTE READING COMPASS

FIELD OF THE INVENTION

This invention relates to remote reading magnetic compasses and more particularly to a remote reading compass having a single pivot and operable without precision gimbal mounting.

BACKGROUND OF THE INVENTION

There is often a need for a remote reading magnetic compass providing an electrical output signal representative of compass heading. A particularly effective digital compass is the subject of U.S. Pat. No. 3,888,016, assigned to the assignee of this invention, wherein a compass disc contains a plurality of optically coded tracks which are photoelectrically sensed to provide digital output signals representative of compass heading. The coded disc is supported for rotation about a normally vertical axis by upper and lower pivot bearings which also maintain optical alignment of the photoelectrically sensed disc with respect to the associated sensor. The compass is mounted within a gimbal assembly to maintain a horizontal disc orientation and minimize spurious motion of the disc. The cost and size of such remote reading compasses are determined to a considerable extent by the precision of the bearing and gimbal assemblies necessary to achieve intended performance.

SUMMARY OF THE INVENTION

Briefly, the present invention provides a remote reading magnetic compass of extremely simple construction and capable of implementation in small size and at low cost. The novel compass includes a disc having a plurality of concentric optically coded tracks on a surface thereof providing coded representations of compass headings, and photoelectric sensing apparatus for providing electrical output signals representative of particular disc positions and therefore of corresponding compass heading. The compass disc assembly has a center of buoyancy above the center of gravity and is submerged in a damping liquid with positive buoyancy. The disc assembly is maintained in operative position by only a single upper pivot bearing with proper bearing force being determined by the buoyant force of the disc assembly within the damping liquid. The compass disc tends to remain in intended horizontal disposition with the static tilt of the disc being compensated by the lower center of gravity without need for counterweights.

A photosensor array is disposed in association with the disc to sense the coded tracks and provide corresponding electrical output signals representative of compass heading. By virtue of the single pivot mounting, the compass housing can tilt by a selected amount such that spurious motion or static tilt will not affect the intended horizontal orientation of the compass disc. If additional tilt of the enclosure is to be experienced during operation, the compass enclosure can be supported by a gimbal assembly which can be of rather crude construction since the gimballing need only maintain the position of the housing within the range of tilt permitted by the pivot assembly itself.

DESCRIPTION OF THE DRAWINGS

The invention will be more fully understood from the following detailed description taken in conjunction with the accompanying drawings in which:

FIG. 1 is a cutaway pictorial view of a remote reading compass constructed and operative according to the invention;

FIG. 2 is a cutaway top view of an alternative embodiment of the invention;

FIG. 3 is a pictorial view of the embodiment of FIG. 1 mounted in a typical gimbal support; and FIG. 4 is a pictorial view of the embodiment of FIG. 2 mounted on a universal joint support.

DETAILED DESCRIPTION OF THE INVENTION

Referring to FIG. 1, there is shown a cylindrical enclosure or housing 10 having a cylindrical wall 12, upper wall 14 and lower wall 15 and which is of closed construction adapted to be filled with and contain a damping liquid 17 therein. The enclosure 10 is formed of a non-magnetic material typically a plastic such as Lexan. A compass disc 16 is disposed within enclosure 10 and is supported for rotation about a normally vertical axis defined by a single pivot assembly which includes a pivot pin 18 upwardly extending from the center of disc 16 and a cooperative bearing 20 affixed to upper wall 14 of enclosure 10. Housing 10 can be dimensioned to retain disc 16 in mounting relation to the pivot assembly so that the pivot pin cannot unintentionally be removed from bearing 20. The pin 18 is affixed to a hub 22 which is secured within an opening provided in disc 16 and which has depending downwardly therefrom a shaft 24 at the lower end of which is affixed a cylindrical magnet 26. The shaft 24 and hub 22 are typically formed of brass, while pivot pin 18 is of stainless steel. The bearing 20 is typically a jeweled cup bearing.

The disc 16 and its associated structure, namely pin 18, hub 22, shaft 24 and magnet 26, is of weight less than the displaced weight of the damping liquid 17 within enclosure 10 such that the disc is buoyantly disposed within the damping liquid. The disc is maintained by the single pivot assembly at a level below its normal buoyant level to provide a predetermined bearing force between pivot pin 18 and associated bearing 20. The disc is freely rotatable about the normally vertical axis, and is tiltable from the horizontal axis by a selected amount by action of the single pivot assembly without any need for gimbal mounting. The bearing 20 is configured with respect to pin 18 to permit relative tilting of housing 10 with respect to disc 16 by an amount determined by the geometry of the bearing assembly and the compass structure. Typically, about ±6° of tilt is provided without affecting the accuracy of the photoelectric sensing of disc 16. The magnet 26 is disposed below the plane of disc 16 such that the center of gravity is below the center of buoyancy for the compass disc and its associated components. The disc assembly tends to remain in a horizontal disposition by virtue of the low center of gravity, with a result that static tilt of the disc is compensated without need for counterweights on the disc. Since the single pivot bearing is upwardly loaded, the bearing tends to become unloaded in the presence of unwanted downward force thereby minimizing the opportunity for bearing damage.

The compass disc 16 includes a plurality of concentric tracks 28 disposed on a surface thereof and defining coded representations of compass headings. A photosensor array 30 is affixed to the upper wall of enclosure 10 in a position to sense the respective tracks 28 of the compass disc. An illumination source 32 such as a light emitting diode is disposed on the opposite side of disc 16 from sensor array 30 to provide illumination of the coded tracks which are sensed by the photosensor array in accordance with the particular angular position of disc 16 with respect to the array. The photosensor array 30 provides a plurality of output signals digitally coded to represent compass heading and these output signals can be processed in any suitable manner to provide an output indication of compass heading for storage, display or other intended use. The photoelectric sensing of compass heading and the electronic processing of the electrical signals produced can be, for example, as shown in the aforesaid patent. Tilting of disc 16 with respect to sensor array 30 causes relative radial movement of the sensed coded tracks but the allowable degree of tilt can be determined such that the radial track movement does not result in code sensing errors. Radial movement of the sensed coded tracks can be minimized by placement of the pivot point of disc 16 in the plane of the disc so that the disc will tilt about this point. In the embodiment of FIG. 1, the disc 16 tilts about a pivot point above the plane of the disc but without material misalignment of the sensed coded tracks sufficient to cause a sensing error.

An alternative embodiment of the novel single pivot remote reading compass is depicted in FIG. 2. The photosensors in this embodiment are a plurality of individual photosensors 40, each of which is disposed in operative association with a respective one of the coded tracks 28 of compass disc 16 and each of which is circumferentially spaced from the other around the disc. A plurality of light emitting diodes 42 or other light sources are similarly disposed on the opposite side of disc 16, with each light source being in alignment with a corresponding one of the photosensors 40 to provide illumination of the associated coded track sensed by the corresponding photosensor. In this embodiment, the coded tracks 28 are angularly displaced in accordance with the intended angular placement of the associated photosensors 40 and light sources 42. In the embodiment of FIG. 1, the coded tracks are usually sensed by the photosensor array 30 along a radius of the disc and thus the plurality of coded tracks are in circumferential alignment. The angular spacing of the individual photosensors, as in the embodiment of FIG. 2, permits a greater amount of tolerable tilt between the compass disc 16 and the photosensors 40, since the radial movement of sensors 40 with respect to the associated coded tracks 28 is minimized by the circumferential spaced arrangement of photosensors.

The embodiments described above may be directly mounted for use in a marine vessel or other installation without any gimballing if the spurious motion or static tilt to be encountered is within the allowable tilt of the single pivoted compass disc. In the event that a greater amount of spurious motion or tilt is expected, the housing 10 can be supported by a gimbal mounting which, however, need not be of precision construction. Indeed, the gimbal mounting can be relatively crude as the horizontal position maintenance of the compass disc need only be within the range of tilt already provided by the single pivot assembly. Thus, the gimbal mounting can provide relatively crude leveling, with fine leveling of the compass disc provided by the self-leveling action of the disc itself.

The gimbal mounting can be of any known configuration. For example, compass housing 10 can be supported within a gimbal ring 44 as shown in FIG. 3, the gimbal ring being pivotably affixed to an outer housing 46 or other mounting structure such that housing 10 can remain in substantially horizontal orientation during spurious movement or tilt of the mounting structure. Alternatively, gimbal mounting can be provided by a ball or other universal joint as shown in FIG. 4. An upwardly extending shaft 48 is affixed at its lower end to the upper wall of the compass housing and at the upper end terminates in a ball 50 which is part of a ball joint 52 affixed to a mounting surface 54 and which can be slotted or otherwise arranged to prevent rotary movement in a horizontal plane. This ball joint will maintain a generally level disposition of the compass enclosure in the presence of spurious motion of mounting surface 54. The horizontal disposition of the compass disc is again more precisely maintained by the self-leveling action of the disc provided by the single pivot bearing supporting the disc within its enclosure.

It will be appreciated that the particular implementations of the novel compass may vary to suit particular operational requirements. For example, the pivot pin can be mounted on the housing, with the bearing cup being on the disc. One or more magnets can be provided in association with the disc other than the cylindrical magnet shown. Or the specific arrangement of the disc and its associated rotatable structure can be variously implemented. Thus, the invention is not to be limited by what has been particularly shown and described except as indicated in the appended claims.

What is claimed is:
1. A remote reading magnetic compass comprising:
 a housing filled with a damping liquid;
 a rotatable compass disc assembly within said housing including:
 a disc having coded representations of compass headings provided on a surface thereof and buoyant in said damping liquid;
 a single pivot bearing coupling said disc to an upper portion of said housing and providing rotation of said disc about a normally vertical axis; and
 magnet means disposed below said disc and spaced therefrom and affixed to said disc for rotation therewith;
 said rotatable assembly being buoyant with respect to said damping liquid and supported by said single pivot bearing at a level in said dampling liquid below the normal level of buoyancy and having a center of gravity below the center of buoyancy to maintain said compass disc in intended horizontal dispostion;
 said single pivot bearing being constructed to permit tilting of said housing with respect to a horizontal axis by a selected amount; and
 means in said housing for photoelectrically sensing the coded representations on said compass disc to provide electrical output signals representative of compass heading.

2. A remote reading magnetic compass according to claim 1 wherein said single pivot bearing includes:
 a pivot pin upwardly extending from said disc in alignment with the axis of rotation thereof; and a bearing cup affixed to an upper portion of said housing and cooperative with said pivot pin to provide rotation of said disc about the axis of rotation and tilting of said housing with respect to the horizontal axis.

3. A remote reading magnetic compass according to claim 2 wherein said coded representations are defined by a plurality of concentric coded tracks on a surface of said disc.

4. A remote reading magnetic compass according to claim 2 wherein said compass disc includes:

a shaft depending downwardly from said disc in alignment with the axis of rotation and to which is affixed said magnet means at a position spaced from said disc, said pivot pin being upwardly extending from said shaft.

5. A remote reading magnetic compass according to claim 4 wherein said photoelectrically sensing means includes:

a light source disposed on one side of said disc for illuminating a portion of said coded tracks; and an array of photosensors disposed on an opposite side of said disc from said light source and operative to sense the illuminated portion of said coded tracks to provide said output signals representative of compass heading.

6. A remote reading magnetic compass according to claim 4 wherein said photoelectrically sensing means includes:

a plurality of photosensors each disposed in operative association with a respective one of said coded tracks;

means for illuminating said coded tracks.

7. A remote reading magnetic compass according to claim 6 wherein said plurality of photosensors are circumferentially spaced from each other around said compass disc.

8. A remote reading magnetic compass according to claim 7 wherein said illuminating means includes a plurality of light sources each circumferentially spaced around said compass disc in alignment with corresponding ones of said photosensors.

9. A remote reading magnetic compass comprising:

a housing filled with a damping liquid;

a rotatable compass disc assembly within said housing including:

a compass disc having photoelectrically sensible coded representations of compass headings provided on a surface thereof and buoyant in said damping liquid;

magnet means disposed below the plane of said disc and spaced therefrom and affixed to said disc for rotation therewith;

a pivot pin upwardly extending from said disc in alignment with the axis of rotation thereof and cooperative with a bearing cup affixed to an upper portion of said housing to provide rotation of said disc about the axis of rotation and tilting of said housing with respect to the horizontal axis;

said rotatable assembly being submerged in said damping liquid with positive buoyancy providing a predetermined bearing force on said bearing cup, said rotatable assembly having a center of gravity below the center of buoyancy thereof to maintain the disposition of said disc substantially in a horizontal plane; and means in said housing for photoelectrically sensing the coded representations on said compass disc to provide electrical output signals representative of compass heading.

10. A remote reading magnetic compass according to claim 1 further including:

a gimbal mounting coupled to and supporting said housing and operative to maintain substantially horizontal orientation of said housing during spurious movement of a mounting structure.

11. A remote reading magnetic compass according to claim 10 wherein said gimbal mounting includes:

a shaft affixed to an upper wall of said housing and upwardly extending therefrom; and a universal joint coupled to the upper end of said shaft and affixed to a mounting structure.

* * * * *